Figures 1, 1A:
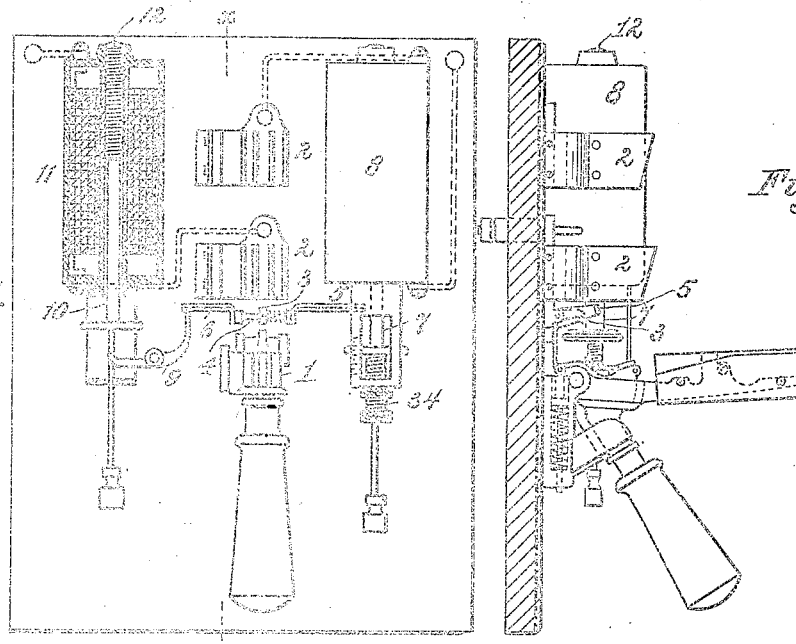

No. 845,655. PATENTED FEB. 26, 1907.
H. W. LEONARD.
AUTOMATIC CIRCUIT BREAKER.
APPLICATION FILED MAR. 21, 1901.

3 SHEETS—SHEET 1.

Witnesses: Inventor.

No. 845,655. PATENTED FEB. 26, 1907.
H. W. LEONARD.
AUTOMATIC CIRCUIT BREAKER.
APPLICATION FILED MAR. 21, 1901.
3 SHEETS—SHEET 2.
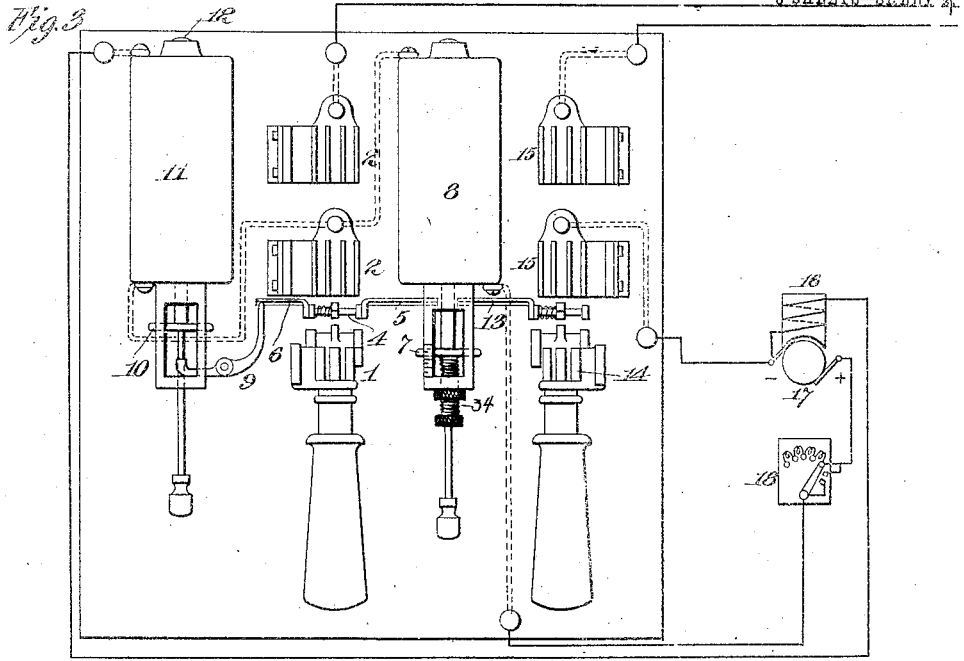
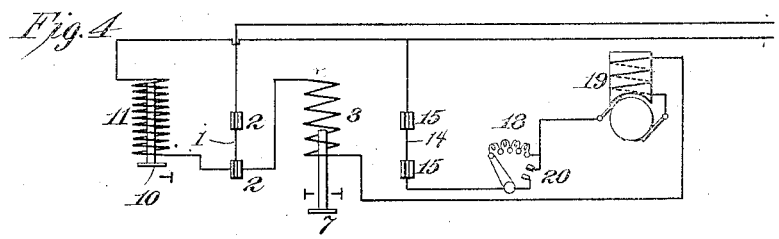
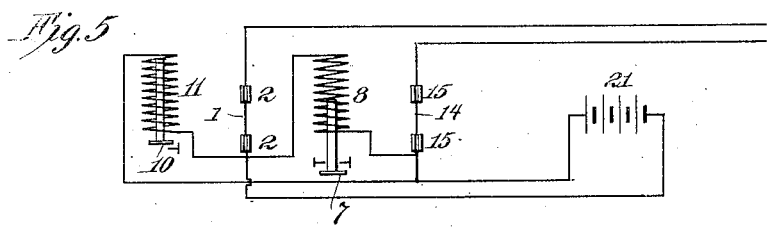
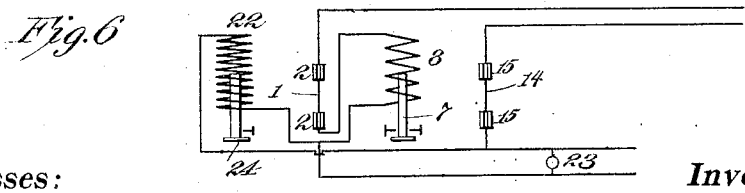
Witnesses:
Jas. F. Coleman
Jno. R. Taylor
Inventor
Harward Leonard
by Dyer Edmond & Dyer
Att'ys.

No. 845,655. PATENTED FEB. 26, 1907.
H. W. LEONARD.
AUTOMATIC CIRCUIT BREAKER.
APPLICATION FILED MAR. 21, 1901.

3 SHEETS—SHEET 3.

Witnesses:
Jas. F. Coleman
Jno. R. Taylor

Inventor
Howard Leonard
by
Att'ys.

UNITED STATES PATENT OFFICE.

HARRY WARD LEONARD, OF NEW YORK, N. Y.

AUTOMATIC CIRCUIT-BREAKER.

No. 845,655.  Specification of Letters Patent.  Patented Feb. 26, 1907.

Application filed March 21, 1901. Serial No. 52,128.

*To all whom it may concern:*

Be it known that I, HARRY WARD LEONARD, a citizen of the United States, residing in the borough of Manhattan, city of New York, State of New York, have invented a certain new and useful Improvement in Automatic Circuit-Breakers, of which the following is a description.

My invention relates to improvements in circuit-breakers and similar devices, and especially to circuit-breakers of the type in which one or more switches or their equivalents are operated automatically whenever the circuit conditions vary beyond certain limits.

In some forms of the invention abnormal variations of amperes in the circuit affect the operation, the circuit being broken at one or more places whenever the number of amperes exceeds or falls below the desired limit. In some forms of the invention the element of voltage is the factor which determines the automatic operation, the circuit being broken when the voltage of the current exceeds or falls below predetermined limits. In other forms of the invention one element may be controlled by the volts and another by the current—for example, a device will be automatically actuated when the current exceeds a predetermined limit and a device will also be automatically actuated whenever the volts fall below a certain predetermined limit. There are many combinations of various possible limits both in respect to current and voltage which are useful in connection with the control of circuits supplying various kinds of electrical translating devices. Furthermore, in some instances a reversal of current or reversal of electromotive force may determine the limit, causing the automatic action of a controlling device. In other instances the element of time may determine the automatic operation. For example, a maximum-ampere device may operate when a predetermined increase in the amperes has continued for a certain predetermined length of time, or a minimum-voltage device may automatically act when the volts have been reduced to a certain amount for a certain length of time. Sometimes the temperature may determine the limit. For example, when the temperature at a certain point exceeds a certain amount a controlling device will be automatically actuated. Sometimes an increase or diminution of pressure at a certain point may determine the limit. Sometimes the velocity of movement of some device may be the controlling element. Sometimes the movement of a device relative to another device may be the controlling element—as, for example, a pendulum whose support is moved beyond a certain limit.

In order that the invention may be better understood, attention is directed to the accompanying drawings, forming part of this specification, and in which—

Figure 2:
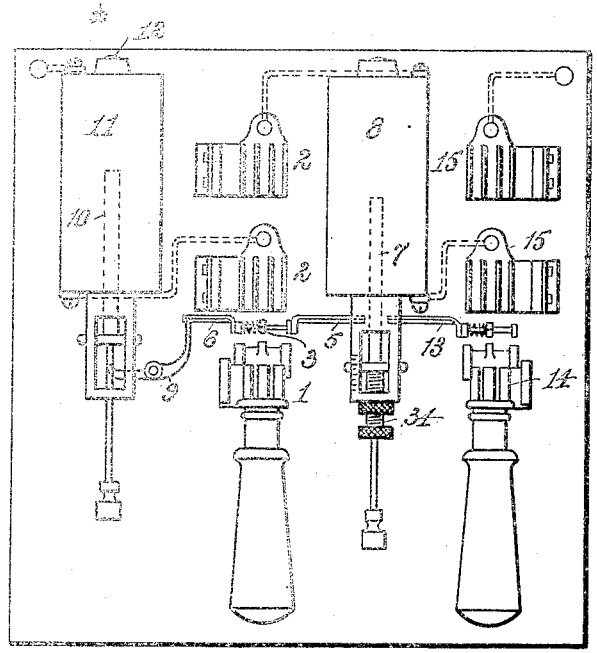
Figure 7:
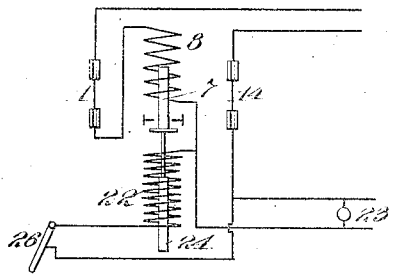
Figure 8:
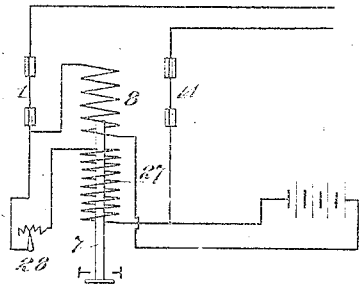
Figure 9:
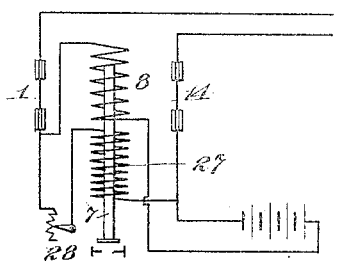
Figure 10:
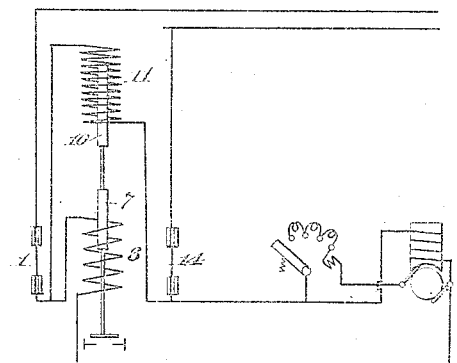
Figure 11:
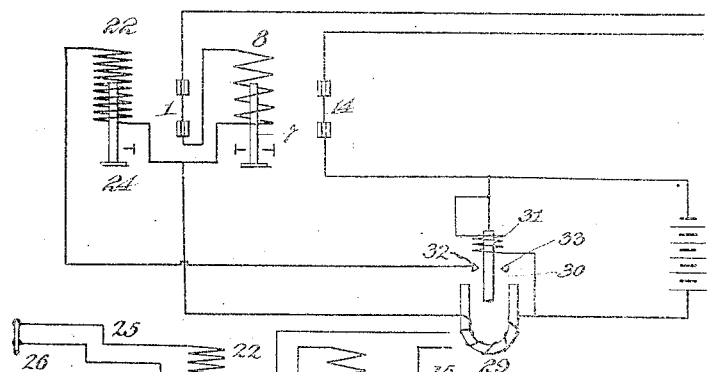

Figure 1 is a front elevation, partly in section, of an automatic switch for breaking the circuit when the current therein exceeds or falls below a definite limit. Fig. 1ª is a section on line $x$ $x$ of Fig. 1; Fig. 2, a view similar to Fig. 1, showing the employment of two switches, both of which simultaneously open on an increase of current beyond the desired limit and one of which opens when the current falls below the desired limit; Fig. 3, a view similar to Fig. 2, showing the device in employment with a shunt-wound electric motor and wherein the circuit thereto will be broken when the voltage fails or in the event of an overload; Fig. 4, a diagram of a somewhat similar arrangement, illustrating it in connection with a series motor and with a no-voltage coil shunted directly across the line; Fig. 5, a diagram illustrating the automatic circuit-breaker in connection with the charging of a storage battery and providing for an automatic opening of the circuit when the electromotive force falls below a predetermined minimum and when it exceeds a predetermined maximum; Fig. 6, a corresponding view showing the invention applied to protect a translating device against an excessive increase in electromotive force or current; Fig. 7, a corresponding view showing a modified arrangement for accomplishing the same purpose; Fig. 8, a corresponding view illustrating the circuit-breaker applied in connection with the charging of a storage battery and providing for the automatic breaking of the circuit in the event of a reversal of current; Fig. 9, a corresponding view of a modification for accomplishing the same purpose; Fig. 10, a corresponding view showing a no-voltage and overload circuit-breaker of modified form operating in connection with a shunt-motor; Fig. 11, a view similar to Fig. 6, showing the device in use in connection with the charging of a storage battery and illustrating a polarized relay for effecting the automatic operation in the event of a reversal of current. Fig. 12 is a diagram of a modification.

In all of the above views corresponding parts are represented by the same numerals of reference.

In Fig. 1 a knife-blade switch 1 is adapted to close a circuit between contacts 2 2 and to be normally locked in its closed position by means of a latch 3, as described in patent granted to myself and Henry Price Ball for electric circuit-breakers, July 22, 1902, No. 705,102. The latch 3 is mounted on a rock-shaft 4, from which trip-arms 5 and 6 extend, as shown. The rock-shaft 4 is mounted in bearings on the base-plate, and a spring is coiled round the shaft with one end engaging one of said bearings and the other end engaging the back of latch 3 to throw it into the latching position. Coöperating with the trip-arm 5 is the core 7 of an overload-solenoid 8, which core carries a disk, as shown, and coöperating with the trip-arm 6 is a lever 9, adapted to be engaged by the disk on core 10 of a minimum-load solenoid 11. As shown, the windings of the two solenoids are in series with each other and the switch-contacts 2 2. The core or plunger 10 of the minimum-load solenoid is held up by the magnetizing force of the solenoid, which is opposed by gravity. The magnetic pull of the circuit-current can be varied within limits, as desired, by adjusting a non-magnetic screw 12 at the top of the solenoid, by which the position of the plunger can be varied relative to the solenoid. If the current be gradually reduced, the magnetic pull supporting the plunger against gravity will gradually become less, and finally at a definite number of amperes the core 10 will fall by its weight and will strike the lever 9 with a blow, tripping the latch 3 and permitting the switch 1 to be opened by the usual ordinary operating-spring. The plunger 7 of the overload-solenoid is normally down, as shown, and in the event of an overload the magnetic pull will elevate the plunger with an accelerated velocity, releasing the latch 3 and permitting the automatic opening of the switch.

In Fig. 2 the construction is substantially the same, except that the core 7 of the overload-solenoid 8 also operates the trip 13 of a switch 14, which normally closes a circuit between contacts 15 15. As shown, both coils and switches are in series with each other. In the event of an underload the core 10 will drop to trip the latch 3 and permit the switch 1 to open. In the event of an overload the core 7 will be elevated, tripping the latches 3 and 13 and permitting both of the switches to open. In the event of an overload, therefore, caused, for example, by a short circuit, the closing of the switch 1, succeeded by the closing of the switch 14, will if the short circuit still exists result in the operation of the solenoid 8 to release the switch 1 and again break the circuit. With this form of device, therefore, as described in said patent of Leonard and Ball, the maximum-circuit breaker cannot be closed by the operator when the condition of the circuit is such that the closing of the circuit causes a current exceeding the predetermined maximum.

In Fig. 3 is shown a double-pole circuit-breaker having two switches 1 and 14, as shown in Fig. 2, and wherein the coil 11 is shown in series with the switch 1, the field 16 of a shunt-motor, and the switch 14. The overload-coil 8 is in series with switches 1 and 14, with the armature 17 of that motor, and with a starting-rheostat 18. When the line voltage falls, the core 10 will drop to open the switch 1. In the event of an overload the core 7 will be elevated, tripping both of the switches.

In Fig. 4 is shown a double-pole circuit-breaker operating with minimum voltage and with maximum current. In this instance the coil 11, which is of high resistance, is connected directly across the line through the switch 1. The overload-coil 8 is in series with the switches 1 and 14 and with a series motor 19, provided also with a starting-rheostat 18. When the electromotive force is on the line, the core 10 is raised and the switch 1 closed, so that the shunt-coil 11 will be connected directly across the line and excited and the core held in its elevated position. The switch 14 is now closed, completing the circuit through the overload-coil 8, motor 19, and starting-rheostat 18. When the voltage drops below the predetermined limit, the core 10 will descend by its weight, releasing the switch 1, which opens the circuit to the motor. In the event of an overload the core 7 will be elevated to trip the latches of both the switches. The starting-rheostat with this form of device is of a well-known type, having no open circuit, but provided with a spring constantly tending to bring its operating-lever to a position to include the entire resistance in the circuit. When the operating-lever is in its full-speed position—i. e., with the resistance cut out— it is held in that position by contacts 20 or other equivalent device, as is common. The arrangement shown in Fig. 4 is especially useful for motors of very large size, (say three-hundred-horse power,) especially when the voltage is about one hundred and twenty volts, as it is very difficult to make a starting-rheostat having in itself automatic features for such service on account of the necessary weight and friction of the operating-lever, both of which factors interfere with the proper action of the automatic features, which would work successfully in connection with starters for small motors.

In Fig. 5 the coil 11, which operates when a definite drop in voltage takes place, is connected across the line between the switches 1 and 14, as shown. The coil 8 in the present instance operates when an increase in the electromotive force beyond the desired limit takes place and is also connected across the line and in series with said switches. As shown, the device is illustrated as being used in connection with the charging of a storage battery 21. In the event of a drop in electromotive force the coil 11 will be weakened or deënergized, permitting the core 10 to fall and open the switch 1, while in the event of an abnormal increase in the electromotive force the coil 8 will be sufficiently energized to elevate the core 7 with a gradual acceleration to release switches 1 and 14.

In Fig. 6 I illustrate a double-pole circuit-breaker arranged to protect a translating device against an excessive increase of electromotive force and current. With this modification the overload-coil 8 is in series with the switch 1, while the maximum-voltage coil 22 (which is used instead of the coil 11) is connected across the line, so as to shunt the translating device 23. As in the previous forms of the invention, the core 7 is adapted to be elevated in the event of an overload to release the switch 14. With the present modification the maximum-voltage coil 22 is arranged to elevate a core 24, arranged like the core 7 and which effects the release of the switch 1. It will be observed that in the event of an overload the coil 8 will operate the switch 14, and in the event of an abnormal increase of electromotive force the coil 22 will operate the switch 1. In some instances it is desirable to have a circuit-breaker not only automatic as to overload, as explained, but also having means whereby it may be opened from a distance by closing a controlling-circuit. Thus, referring to Fig. 12, an auxiliary circuit 25 may extend to a distant point and be provided with an operating-switch 26 therein, so that by operating the switch 26 the coil 22 may be energized. It will of course be understood that when the circuit 25 is not used the coil 22 will be so proportioned to its core 24 that the latter will be elevated when an abnormal increase of electromotive force occurs on the line. When, however, the auxiliary circuit 25 is used for operating the circuit-breaker from a distance, the circuit of coil 22 will be normally open and the coil will be so proportioned with respect to its core that the normal electromotive force of the line will be sufficient to effect the elevation of the core 24 upon the closing of the circuit through the coil by switch 26.

In Fig. 7 I illustrate another way of accomplishing the same result. With this modification I mount the coil 22 below the core 7 and arrange the core 24 to engage the lower end of the core 7 when the coil 22 is energized, the core 24 being adapted to slide up on the guide, which is shown extending to core 7. It will be seen that in the event of an overload the coil 8 will elevate its core 7 to release the switch 14 and also the switch 1, if desired. If now it is desired to open the circuit from a distance, the switch 26 will be operated, closing the circuit through the coil 22, elevating the core 24 with a gradual acceleration until it strikes the core 7, which will itself be then elevated to release the switch 14 or switches 1 and 14.

In Fig. 8 I illustrate a reverse-current circuit-breaker which opens both switches automatically if the current charging a storage battery, as shown, should reverse due to the electromotive force of the source falling below that of the battery. The coil 8, which in the present instance is affected by the current, is connected in series with the storage battery being charged. Its core 7 when elevated trips both the switches 1 and 14. Coöperating with the core 7 is a coil 27, which is shunted across the line and which is provided in series with it with an adjusting-rheostat 28, by which its magnetic effect may be adjusted. When the current flows to the battery in the normal direction, the magnetizing effects of the two coils are counter to each other, so that the core 7 will not be elevated. If, however, the current in the local battery-circuit reverses in sense, the effect of the coil 8 will be to supplement the coil 27, elevating the plunger and opening the circuit-breaker. The rheostat 28 enables one to adjust the device so that a predetermined current-flow will cause the circuit to be opened. For example, when no current flows in coil 8 the coil 27 may have sufficient current to cause the circuit-breaker to be opened, or the adjustment may be such that a reversed current of predetermined strength is required before the circuit will be opened.

In the form of the invention just described and in all others in which the core is raised by magnetism against gravity the initial position of the core relative to its coil is adjustable by means of adjusting-screw 34, so that the amount of magnetic effect necessary to start the core can be varied as desired, and a scale will also be used indicating to the operator the desired initial adjustment of the core in order that a definite magnetic effect, as determined by amperes or volts, may be obtained to effect the elevation of the core. Also in those constructions where a raised core is allowed to fall and trip the mechanical restraining means upon the occurrence of certain conditions it will be understood that the adjustment of a part, such as screw 12, Fig. 1, will vary the restraining force required to keep the core or plunger raised, and thereby enable the operator to adjust the device to act upon the occurrence of desired predetermined conditions.

In Fig. 9 I illustrate a very similar arrangement to that shown in Fig. 8, except that normally the coils 8 and 27 act accumulatively, while on a reversal of the current through the battery the coil 8 will oppose the coil 27, permitting the core 7 to drop and opening the circuit-breakers. It will be understood that where I have shown two coils coöperating to act in a certain way, as in Figs. 7 to 9, they may be variously arranged, and the two cores may ordinarily be joined mechanically or may be united into a single core. Also the two coils may sometimes be arranged one above the other, or in many instances one may be superimposed upon the other, and in practice the latter construction is preferable. The displacement of the coils with reference to each other, as shown in the drawings, adds to the clearness, however.

In Fig. 10 I illustrate a no-voltage and overload circuit-breaker employed in connection with a shunt-motor. With this modification the cores 7 and 10 are mechanically connected together. The no-voltage coil 11 is connected directly across the line, so that normally both of the cores will be elevated and the circuit-breakers 1 and 14 closed. A normal current for operating the motor energizes the coil 8 and tends to pull downwardly on the core 7; but this effect is not sufficient to oppose the attraction of the coil 11. In the event of an overload, however, the coil 8 will be sufficiently energized to overcome the attraction of the coil 11, starting the cores downwardly, which movement gradually accelerates to trip the latches of one or both of the switches. In the event of a drop of electromotive force below the normal limit the coil 11 will be sufficiently deënergized to release the core 10, and both of the cores will then descend, so as to open one or both of the switches. With this modification, therefore, the same movement of the cores will be effected by a drop in electromotive force and by an increase of current. Of course in many instances the two cores 7 and 10 may be one elongated core, or core 7 may be adjustable along the rod shown, passing through its center to vary the relative effects of the two coils.

Referring to Fig. 11, I show a somewhat similar arrangement to that shown in Fig. 6, the device being used in connection with the charging of a storage battery, which is connected in series with the magnet 29 of a polarized relay. The armature 30 of the relay is provided with a magnetizing-coil 31, connected across the battery, for magnetizing it in a definite sense, as shown. The armature 30 of the polarized relay is in circuit with the coil 22; but that circuit is normally broken at the contact 32, which is controlled by said armature. Normally the armature 30 will be in contact with a back-stop 33, so that the coil 22 will be deënergized. In the event of a reversal of current, however, through the battery the magnetism of the magnet 29 will be reversed in sense, moving the armature 30 in the other direction and closing the contact 32 to energize the coil 22, elevate the core 24, and open the switch. In the event of overload the overload-coil 8 elevates its core 7 as usual.

It will be understood that the constructions indicated in Figs. 8, 9, and 11 are applicable to any form of apparatus where one source is in circuit with another—such, for example, where two dynamos are in parallel and where an abnormal reversed current may flow between the two sources of electromotive force.

It is very advantageous to provide two independently-operative switches in the circuit as described, and shown in the various figures, not only as regards greater reliability and efficiency of the apparatus, but also on account of the advantage secured which overcomes the danger of the operator keeping the circuit closed when an overload, short circuit, or other objectionable condition exists. For example, when the operator closes one switch and then the other if any abnormal electrical condition exists the first will be opened automatically, even though the second is held closed by the operator, and the possibility of maintaining the circuit closed is thus avoided.

Although the drawings are largely diagrammatic, the general construction indicated in each case will be understood and may be similar in general to that shown in Figs. 1 to 3.

Having now described my invention, what I claim as new, and desire to secure by Letters Patent, is as follows:

1. The combination with a circuit, of a controller therefor, said controller comprising a switch, a device arranged to cause the movement of said switch, magnetic means for holding said device against gravity, whereby when the magnetism is reduced to a predetermined minimum due to a certain abnormal electrical condition of said circuit said device falls and performs its function, and also comprising a second switch, a magnet, a magnetic mass movable against gravity under the influence of said magnet when its magnetic influence exceeds a predetermined maximum due to a certain other abnormal electrical condition of said circuit, and means for causing the movement of both of said switches when said magnetic mass is thus moved against the action of gravity.

2. The combination with a circuit, of a controller therefor, said controller comprising a switch-arm, a magnet connected with said circuit and having a coöperating iron part normally up and which falls and causes a movement of the switch-arm when the energy in said circuit falls below a predetermined limit, and also comprising a second switch, and second magnet having a coöperating iron part normally down and which rises and causes movement of both of said switches when the energy in said circuit exceeds a predetermined limit.

3. The combination with an electric motor having its armature and field winding in shunt relation, of a circuit-controller comprising a switch, a magnet in series with the field-winding and having a vertically-moving coöperating part which is normally sustained by magnetic action against gravity and which when no voltage occurs on the circuit falls and causes said switch to affect the armature-circuit, and also comprising a second switch, and a second magnet carrying the armature-current and having a vertically-moving coöperating part which is raised against gravity when the current through the motor-armature exceeds a predetermined amount and thereby causes both of said switches to affect the armature-circuit.

4. The combination with a circuit, of a circuit-controller, said controller comprising two independently-movable switches connected in series in said circuit, two independent electroresponsive devices protectively related to said switches and each having an automatically-movable part whose movement is independent of the movement of the other part, one moving when the electromotive force upon the circuit becomes abnormal and the other moving when the current in the circuit becomes abnormal.

5. The combination with two independently-movable switches, of two independent electroresponsive devices and a device coöperating with each of said electroresponsive devices, one of which falls by gravity when the electromotive force becomes too low and thereby causes the movement of one of said switches to affect the circuit, and the other being raised against gravity when the current exceeds a predetermined amount and thereby causes the movement of one or both of said switches to affect the circuit.

6. The combination with two independently-movable switches, of two magnets, one having a coöperating part normally held by magnetism against gravity and which upon an abnormal electrical condition of the circuit allows the coöperating part to fall under the action of gravity and thereby cause the movement of one of said switches to affect the circuit, and a second magnet having the coöperating part normally down and which under a different abnormal electrical condition of the circuit is raised by magnetism acting against gravity to cause the movement of one or both of said switches to affect the circuit.

7. The combination of two independently-movable switches, an electroresponsive device for automatically and simultaneously effecting the opening of both of said switches when excessive current flows, and a second independent electroresponsive device for effecting independently of said first device the opening of only one of said switches under an abnormal condition of electromotive force upon the circuit.

8. The combination of two independently-movable switches, independent latches for holding said switches closed against means tending to open them, an electroresponsive device for automatically and simultaneously effecting the tripping of both of said latches when excessive current flows, and a second independent electroresponsive device for effecting independently of said first device the tripping of one of said latches under an abnormal condition of the electromotive force upon the circuit.

9. The combination of two independently-movable switches, independent latches for holding said switches closed against means tending to open them, an electromagnet having a movable magnetic mass responding to excessive flow of current and arranged to move upward to trip both of said latches, and a second independent magnet having a movable magnetic mass responding to an abnormal condition of the electromotive force upon the circuit and arranged to fall to trip only one of said latches.

10. The combination of a plurality of electric switches adapted to be moved manually and independently into normal position, a controlling device for automatically controlling the movement of all of said switches upon the occurrence of a certain abnormal electrical condition, and a second controlling device for automatically controlling independently of said first device the movement of less than all of said switches upon the occurrence of a different abnormal electrical condition.

11. The combination of a plurality of electric switches adapted to be moved manually and independently into normal position, a controlling device for automatically controlling the movement of said switches upon the occurrence of overload-current and a second controlling device for automatically controlling independently of said first device the movement of less than all of said switches upon the occurrence of a different abnormal electrical condition.

12. The combination of a circuit, two independently-movable switches connected in series in said circuit, a device having a movable mass which under certain electrical conditions of the circuit moves automatically to effect the opening of both of said switches, and a second independently-acting device having a movable mass which under different electrical conditions of the circuit moves automatically to effect the opening of at least one of said switches, the direction of motion of said two masses referred to being different.

13. The combination of a circuit, a switch connected in series in said circuit, a latch located below the switch-contacts for holding the movable part of said switch in closed position, said latch having two extensions, an electromagnetic device located on one side of said contacts and having a movable part extending below its winding, means below said winding and controlled by said movable part for affecting said latch by acting upon one of said extensions, an electromagnetic device located at the opposite side of said contacts and having a movable part extending below its winding, means below said latter winding and controlled by said latter movable part for affecting said latch by acting upon the other of said extensions, one of said devices acting upon the occurrence of one electrical condition of the circuit and the other of said devices acting upon the occurrence of a different electrical condition of the circuit.

14. The combination of a circuit, two independently-movable switches in series in said circuit, a latch located below the contacts of each of said switches for holding the movable part of each of said switches in closed position, an electromagnetic winding having a movable part, means below said winding and controlled by said movable part for tripping both of said latches upon the occurrence of one electrical condition of the circuit, and additional electromagnetic means having a movable part for causing at least one of said latches to be tripped upon the occurrence of a different electrical condition, said additional means comprising a winding located above the part affected by the movement of its movable tripping part.

15. The combination of a constant electromotive-force-supply circuit, an electric motor of the shunt-field type, controlling means therefor comprising two independently manually closable switches connected in series with the motor-armature across said circuit, independent mechanical restraining means for each of said switches, independent means for each of said switches tending to open each switch separately, two electromagnetic responsive releasing means, each of said releasing means being independent of the other and each having a movable part which acts automatically and independently of the other part and delivers a blow to affect said restraining means, one of said releasing means being responsive to a predetermined overload-current for protecting said motor from excessive current and acting to cause the opening of both of said switches, and the other of said releasing means being responsive to low voltage.

16. The combination of an electric motor of the shunt-field type, two independently manually closable switches in series with each other and with the motor-armature, electroresponsive means for automatically effecting the opening of both of said switches upon overload or the opening of one of said switches upon overload if the other be held closed by the operator, said means comprising a movable part which when moved automatically delivers a blow to effect the said opening of said switches, and an independent electroresponsive means for automatically effecting the opening of at least one of said switches, said second means also comprising a movable part which when moved automatically delivers a blow independently of the movement of said first-named part to effect the opening of at least one of said switches.

17. The combination of a motor of the shunt-field type adapted for use upon a constant electromotive-force circuit, controlling means therefor comprising two independently-movable switches in series with each other and with the motor-armature and adapted to be closed successively, independent mechanical restraining means for each of said switches, an independent spring for each of said switches each tending to open the switch which it controls, two electromagnetic responsive releasing means, each of said releasing means being independent of the other and each acting independently of the other for automatically and separately affecting said restraining means, one of said releasing means being automatically responsive to predetermined decrease of current in its winding and the other being automatically responsive to predetermined increase of current in its winding, said switches and releasing means which responds to increase of current being protectively related so that one of said switches will always be opened if overload occurs when the last switch is closed for completing the circuit, and the said two responsive means having different resultant effects upon said switches whereby a visual indication is obtained showing which of said releasing means has acted.

This specification signed and witnessed this 2d day of March, 1901.

H. WARD LEONARD.

Witnesses:
FRANK L. DYER,
JNO. R. TAYLOR.